June 5, 1951 P. C. HUTTON 2,555,928
MECHANICAL POWER UNIT
Original Filed Nov. 20, 1947 2 Sheets-Sheet 1
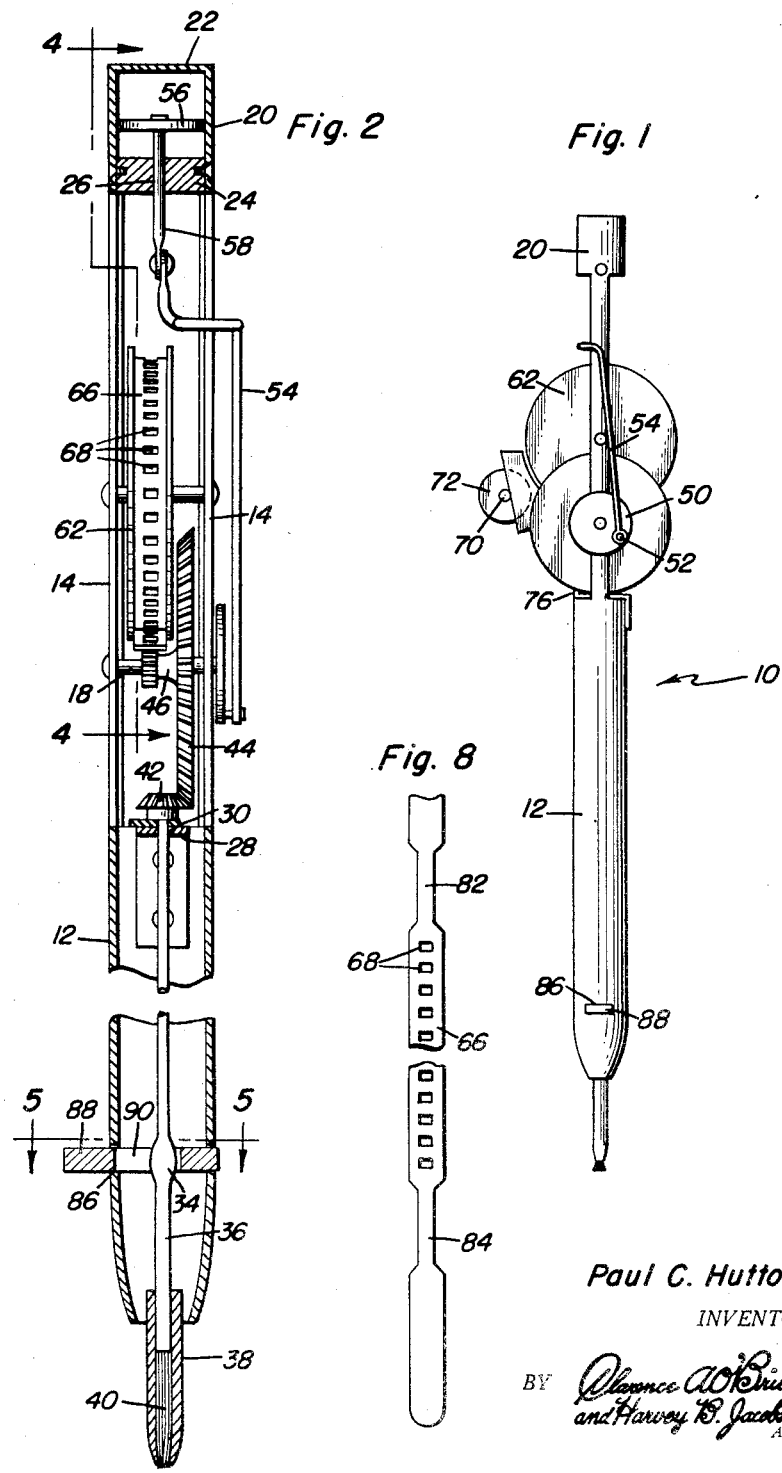
Paul C. Hutton
INVENTOR.

June 5, 1951  P. C. HUTTON  2,555,928
MECHANICAL POWER UNIT
Original Filed Nov. 20, 1947  2 Sheets-Sheet 2
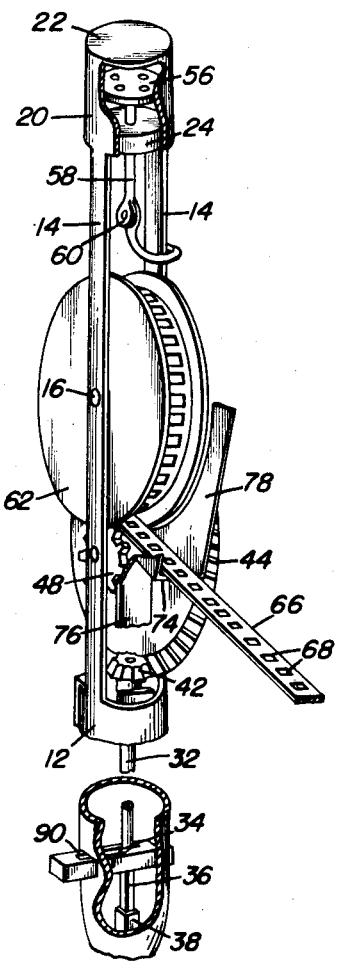
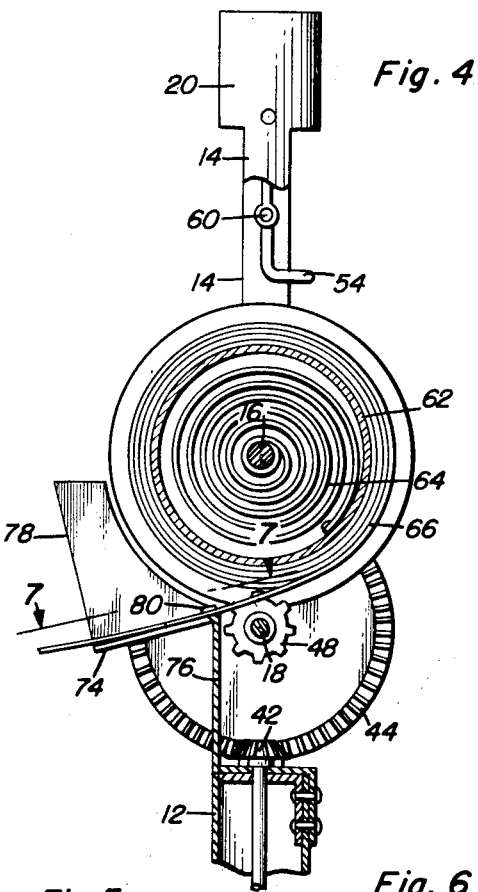
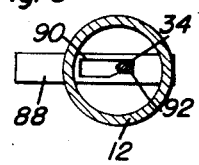
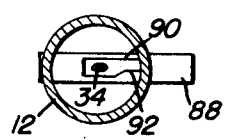
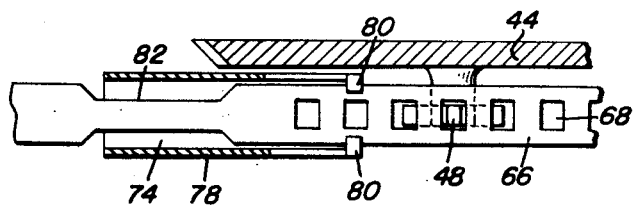
Paul C. Hutton
INVENTOR.

Patented June 5, 1951

2,555,928

UNITED STATES PATENT OFFICE 2,555,928

MECHANICAL POWER UNIT

Paul C. Hutton, Istanbul, Turkey

Original application November 20, 1947, Serial No. 787,076, now Patent No. 2,510,978, dated June 13, 1950. Divided and this application March 30, 1950, Serial No. 152,853

8 Claims. (Cl. 185—37)

This invention relates to a mechanical power unit and is a division of application Serial No. 787,076, filed November 20, 1947, now issued and identified as Patent No. 2,510,978.

An object of this invention is to provide means for securing energy in a spring and means to convert the energy so stored into rotary motion for various means, such as driving an eraser, operating a small drill, or for any other suitable purpose where rotary motion may be employed or desired.

Another object of the invention is to facilitate the periodic storage of energy in a spring for repeated operation and to govern the rapidity with which the energy stored in the spring may be dispensed.

A further object of the invention is to provide means for arresting or freeing the rotary elements of the device while the latter is held in the hand of the user, and also providing means for utilizing the energy of the arm movements of the user in storing the energy in the spring.

Still further objects of the invention reside in the provision of a mechanical power unit that is strong, durable, highly efficient in operation, simple in construction and manufacture, capable of being readily used to impart motion to various kinds of devices for various purposes, and which is relatively inexpensive.

These, together with the various ancillary objects of the invention which will become apparent as the following description proceeds, are attained by this mechanical power unit, a preferred embodiment of which has been illustrated in the accompanying drawings, by way of example only, wherein:

Figure 1 is a side elevational view of a mechanical power unit embodying the features of the invention and showing the unit equipped with a rotary eraser;

Figure 2 is an enlarged vertical sectional view taken in a plane substantially perpendicular to the plane in which Figure 1 is viewed;

Figure 3 is an enlarged fragmentary perspective view of the invention;

Figure 4 is an enlarged sectional view as taken along the line 4—4 in Figure 2;

Figure 5 is a horizontal sectional view taken substantially along the line 5—5 in Figure 2;

Figure 6 is a view similar to Figure 5 showing the push button in a position to free the shaft for rotation;

Figure 7 is a fragmentary sectional view as taken along the line 7—7 in Figure 4; and Figure 8 is a fragmentary plan view of the tape or ribbon showing it extended.

With continuing reference to the accompanying drawings wherein like reference numerals designate similar parts throughout the various views, reference numeral 10 generally indicates the mechanical power unit comprising the present invention. The power unit 10 includes a tubular housing 12 which has provided adjacent one end a pair of diametrically disposed parallel longitudinally extending arms 14. Intermediate the ends of the arms 14 there is fixed a shaft 16. A similar shaft 18 extends between the arms 14 substantially midway between the shaft 16 and the housing 12, and carried at the extreme ends of the arms 14 remote from the housing 12 is a cylinder 20 the end of which remote from the arms 14 is closed by a head 22. The opposite end of the cylinder 20 has fitted therein a plug 24 having an axial opening 26 therein which aligns with the axis of the tubular housing 14. A bracket 28 extends transversely across the end of the housing 12 adjacent the arms 14 and is provided with an axial opening 30.

Mounted for rotation through the axial opening 30 in the bracket 28, and about the longitudinal axis of the housing 12 is a shaft 32, the lower end of which is flattened as at 34 and carries a rectangular portion 36 which extends beyond the end of the housing 12 remote from the arms 14 to receive a sleeve 38 in which a suitable eraser 40 is held. The end of the shaft 32 remote from the flattened portion 34 has fixed thereto a bevel drive pinion 42 which intermeshes with a bevel gear 44 rotatably mounted on the shaft 18. The hub 46 of the bevel gear 44 carries a toothed wheel 48. Carried by the hub 46 of the wheel 44 adjacent the end remote from the toothed wheel 48, is a crank disk 50 carrying an eccentric pin 42 to which one end of a connecting rod 54 is coupled. Mounted for longitudinal sliding movement in the cylinder 20 is a piston 56, the piston rod 58 of which projects through the opening 26 in the plug 24 and has pivotally connected thereto as at 60 the opposite end of the connecting rod 54. As can be readily seen, as the gear 44 rotates to drive the pinion 42 and the shaft 32, the piston 56 will be reciprocated in the cylinder 20, to compress the air in the opposite ends of the cylinder and hence retard the speed with which the gear 44 and the shaft 32 are driven.

Mounted for rotation on the shaft 16 is a spring loaded drum 62, and fixed to the shaft 16 within the drum 62 is one end of a spiral spring 64, the opposite end of which is riveted or otherwise fixed to the drum so that when the drum is rotated in one direction, the spring will be energized. Attached to one end of the drum 62 is a table or ribbon 66 which is so arranged that when the drum rotates under the influence of the spring 64, the ribbon will be wound on the drum. The ribbon 66 is provided with a longitudinal row of longitudinally spaced openings 68 in which the teeth of the wheel 48 engage so that as the drum 62 rotates under the influence of the spring 64, the gear 44 will be driven to cause the shaft 32 to rotate.

The ribbon or tape 66 is of the self-winding type, and it is so tensioned as to tend to wind upon itself, and the end of the tape or ribbon 66 remote from that which is connected to the drum 62 is fixed to a shaft 70 carrying spaced parallel disks 72 which cooperate with the shaft in forming a reel or magazine upon which that portion of the tape which is not wound upon the drum is adapted to be coiled. A suitable ribbon guide 74 is carried by a bracket 76 and extends outwardly in a direction perpendicular to the axis of the drum 62. The ribbon guide 74 is provided along opposite side edges with upstanding flanges 78 the outer edges of which are adapted to be engaged by the projecting ends of the shaft 70 when the tape is wound thereon between the disks 72 in order to support the tape magazine in proper position during the winding of the tape on the drum 62. Formed at the ends of the flanges 78 adjacent the sprocket or toothed wheel 48 are inwardly projecting guide tongues 80 which as shown partially overlie the top surface of the ribbon 66 adjacent its opposite side edges in order to hold it in engagement with the teeth of the sprocket or toothed wheel 48 during the normal operation of the device. In order that the ribbon or tape be disengaged from the sprocket wheel during the winding of the spring 64, the ribbon is provided in its side edges adjacent the end remote from that which is attached to the drum 62 with oppositely disposed notches 82 through which the guide tongues 80 may pass. When the drum has been fully wound, the laterally opening notches 84 in the tape 66 adjacent the end of the tape which is attached to the drum 62 will align with the guide tongues 80 so that the ribbon 62 may be re-engaged with the sprocket or toothed wheel 40 and the device made ready for use under the influence of the energy stored in the spring.

In order to provide a manual control for arresting the rotation of the shaft 32, the tubular housing 12 is provided near the end remote from the bracket 28 with diametrically opposed aligned openings 86 through which a push bar or member 88 is slidably emplaced. The push member 88 is provided with an elongated slot 90 having an offset portion 92 which when the push member is in position is adapted to engage the flattened portion 34 of the shaft 32 to arrest rotation of the shaft.

The energy is stored in the spring 64 by exerting pull on the shaft 70 to which the tape or ribbon 66 is coupled. The fingers of one hand are hooked around the projecting ends of the shaft 70 and the tubular body 14 is grasped in the opposite hand. The tape 66 is then disengaged from the sprocket 48 so that upon moving the parts away from one another along a rectilinear path the tape 66 will be uncoiled from its position about the drum 62, thus energizing the spring 64. With the spring thoroughly energized, the tape is re-engaged with the sprocket 48 and upon releasing the shaft 70 the tape will coil itself upon the shaft 70 between the flanges 72. Upon moving the push member 88 to free the shaft 32 for rotation, it is obvious that the engagement of the teeth of the wheel 48 in the opening 68 in the ribbon or tape 66 will rotate the gears 44 and 42 by the effort of the spring 64 to wind the tape on the drum 62 and cause the shaft 32 to be driven. Too rapid rotation of the shaft is governed by movements of the piston 56 in the cylinder 20, and rotation of the shaft may be arrested by moving the offset portion 92 of the push member 88 into position to engage the flattened portion 34 of the shaft. Hence by shifting the position of the push member 88 back and forth through the slots 86 it is evident that the rotation of the shaft 32 may be stopped or started under the direct control of the operator.

Since from the foregoing the construction and advantages of this mechanical power unit is readily apparent, further description is believed to be unnecessary.

However, since numerous modifications will readily occur to those skilled in the art after a consideration of the foregoing specification and accompanying drawings, it is not intended to limit the invention to the precise embodiments herein described, but all suitable modifications and equivalents may be readily resorted to which fall within the scope of the appended claims.

Having described the invention, what is claimed as new is:

1. A mechanical power unit including an elongated tubular housing, a shaft rotatably mounted in said housing, a gear train carried by said housing, said gear train being operatively drivingly connected with said shaft, a drum on said housing, a spring within said drum, said spring being fixed at one end and fastened at its other end to said drum, a tape connected at one end to the drum, spaced apertures in said tape, a gear of said gear train engaging said tape and adapted to project through said spaced apertures, and means for disconnecting said tape from the gear train.

2. A mechanical power including a tubular housing having a shaft rotatably mounted thereon, a gear train operatively drivingly connected to said shaft, a drum on said casing, a spring anchored at one end and secured at its opposite end to said drum, a tape secured to said drum, said tape being engaged by a gear of said gear train so that as the tape is wound on said drum under the influence of said spring the gear train will be driven and the shaft rotated, and means for disconnecting said tape from said gear.

3. A mechanical power unit including an elongated tubular housing, a shaft mounted in said housing, one end of said shaft projecting beyond one end of said housing for coupling to an eraser, a gear train carried by said housing and having driving connection with said shaft, a drum mounted on said housing adjacent said gear train, a spring disposed within said drum and secured thereto, a tape connected at one end to the drum and adapted to be wound thereon under the influence of said spring, a longitudinal row of longitudinally spaced apertures in said tape in meshing engagement with a gear of the gear train so that as the tape is wound upon the drum under the influence of the spring the gear train will be driven and the shaft rotated, and means for disconnecting said tape from the gear train.

4. A mechanical power unit including a tubular housing having a shaft rotatably mounted thereon, a gear train operatively drivingly connected to said shaft, a drum on said casing, a spring disposed in said drum and secured at one end to said drum and fixed at its other end, a tape secured to said drum, said tape being engaged by a gear of said gear train so that as the tape is wound on said drum under the influence of said spring the gear train will be driven and the shaft rotated, means for disconnecting said tape from said gear train, and governing means to retard the speed of rotation of the gear train.

5. A mechanical power unit including an elongated tubular housing, a shaft mounted in said housing, one end of said shaft projecting beyond one end of said housing for coupling to an eraser, a gear train carried by said housing and having driving connection with said shaft, a drum mounted on said housing adjacent said gear train, a spring located within said drum and secured thereto, a tape connected at one end to the drum and adapted to be wound thereon under the influence of said spring, a longitudinal row of longitudinally spaced apertures in said tape in meshing engagement with a gear of the gear train so that as the tape is wound upon the drum under the influence of the spring the gear train will be driven and the shaft rotated, means for disconnecting said tape from the gear train, and governing means to retard the speed of rotation of the gear train.

6. A mechanical power unit including an elongated tubular housing, a shaft rotatably mounted in said housing, a gear train carried by said housing, said gear train being operatively drivingly connected with said shaft, a drum on said housing, a spring secured to said drum, a tape connected at one end to the drum, spaced apertures in said tape, a gear of said gear train engaging said tape and adapted to project through said spaced apertures, means for disconnecting said tape from the gear train, a cylinder, a piston operable in said cylinder to compress air in said cylinder so that the movement of the piston will be retarded by the compression of the air in the cylinder, and means establishing a driving connection between said piston and said gear train.

7. A mechanical power unit including a tubular housing having a shaft rotatably mounted thereon, a gear train operatively drivingly connected to said shaft, a drum on said casing, a spring disposed in said drum, said spring being anchored at one end and fastened at its other end to said drum, a tape secured to said drum, said tape being engaged by a gear of said gear train so that as the tape is wound on said drum under the influence of said spring the gear train will be driven and the shaft rotated, means for disconnecting the tape from the gear train, a cylinder, a piston operable in said cylinder to compress air in said cylinder so that the movement of the piston will be retarded by the compression of the air in the cylinder, and means establishing a driving connection between said piston and said gear train.

8. A mechanical power unit including an elongated tubular housing, a shaft mounted in said housing, one end of said shaft projecting beyond one end of said housing for coupling to an eraser, a gear train carried by said housing and having driving connection with said shaft, a drum mounted on said housing adjacent said gear train, a spring located within said drum and secured thereto at one end and being fixed at its opposite end, a tape connected at one end to the drum and adapted to be wound thereon under the influence of said spring, a longitudinal row of longitudinally spaced apertures in said tape in meshing engagement with a gear of the gear train so that as the tape is wound upon the drum under the influence of the spring the gear train will be driven and the shaft rotated, means for disconnecting the tape from the gear train, a cylinder, a piston operable in said cylinder to compress air in said cylinder so that the movement of the piston will be retarded by the compression of the air in the cylinder, and means establishing a driving connection between said piston and said gear train.

PAUL C. HUTTON.

REFERENCES CITED

The following references are of record in the file of this patent:

UNITED STATES PATENTS

| Number | Name | Date |
| --- | --- | --- |
| 1,503,787 | Folk | Aug. 5, 1924 |
| 2,372,932 | Brockman | Apr. 3, 1945 |
| 2,420,825 | Hutton | May 20, 1947 |
| 2,429,040 | Zaverl | Oct. 14, 1947 |
| 2,510,978 | Hutton | June 13, 1950 |

FOREIGN PATENTS

| Number | Country | Date |
| --- | --- | --- |
| 667,228 | France | June 10, 1929 |